United States Patent
Voorhees et al.

(10) Patent No.: US 7,084,618 B2
(45) Date of Patent: Aug. 1, 2006

(54) PARALLEL BUS DEBUGGING TOOL

(75) Inventors: William Voorhees, Colorado Springs, CO (US); William Schmitz, Monument, CO (US); Mark Slutz, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 299 days.

(21) Appl. No.: 10/731,534

(22) Filed: Dec. 8, 2003

(65) Prior Publication Data

US 2005/0134163 A1 Jun. 23, 2005

(51) Int. Cl.
*G01R 31/28* (2006.01)
*G01R 31/02* (2006.01)
*G01R 31/26* (2006.01)

(52) U.S. Cl. ............... 324/158.1; 324/754; 324/765
(58) Field of Classification Search ............... None
See application file for complete search history.

(56) References Cited

U.S. PATENT DOCUMENTS

| | | | | |
|---|---|---|---|---|
| 5,778,194 | A * | 7/1998 | McCombs | 713/600 |
| 5,805,833 | A * | 9/1998 | Verdun | 710/303 |
| 6,061,754 | A * | 5/2000 | Cepulis et al. | 710/312 |
| 6,311,245 | B1 * | 10/2001 | Klein | 710/306 |
| 6,562,636 | B1 * | 5/2003 | Richmond et al. | 324/760 |
| 6,682,945 | B1 * | 1/2004 | Richmond et al. | 324/758 |
| 6,832,339 | B1 * | 12/2004 | Reed et al. | 324/74 |
| 2004/0054689 | A1 * | 3/2004 | Salmonsen et al. | 707/104.1 |
| 2004/0113645 | A1 * | 6/2004 | Richmond et al. | 324/760 |

* cited by examiner

*Primary Examiner*—Jermele Hollington
(74) *Attorney, Agent, or Firm*—Cochran, Freund & Young LLC

(57) ABSTRACT

A system and method for testing the signals on a parallel communication bus uses a single printed circuit board that connects to the bus. The signals from the bus may be passively and actively filtered prior to a multiplexer. The multiplexer may be controlled by a variety of inputs, including communications over a second bus by a remote device. The output of the multiplexer is one or more probe points that may be connected to a measurement device.

27 Claims, 3 Drawing Sheets

PARALLEL BUS DEBUGGING TOOL

BACKGROUND OF THE INVENTION a. Field of the Invention

The present invention pertains generally to testing of communications busses and more specifically to signal probing of communications busses with a multitude of signals.

b. Description of the Background

Parallel communication busses typically have a multitude of signal lines that are operable to send electrical signals between devices. It is often desirous to test one or more lines of the bus by using various electronic test devices such as a scope or meter. When testing a bus that comprises many signals, a technician may be required to disconnect and connect a probe for each individual signal. Some communication busses have in excess of sixty or more signals, causing the testing of each line of the bus to become time consuming and error prone.

Direct probing of some communications busses may cause the performance of the bus to be disrupted or compromised. In such instances, the measurements taken may be skewed, distorted, or meaningless. Often, certain circuitry may be necessary to isolate the signals from the test equipment.

Some communication busses use an adaptive filtering mechanism whereby a device on the bus sets specific filtering parameters to maximize the signal integrity at that particular point of the bus. In some instances, one or more devices on the bus may transmit a training signal that is received and used by the filter to set the adaptive filter parameters. Measurements may be desired with or without adaptive filtering operational.

It would therefore be advantageous to provide a system and method for simply testing a multitude of signal lines on a parallel communication bus. It would be further advantageous to provide a system and method for testing a multitude of signal lines wherein adaptive filtering may be optionally used.

SUMMARY OF THE INVENTION

The present invention overcomes the disadvantages and limitations of previous solutions by providing a system and method for testing the signals on a parallel communication bus. A scope probe device is connected to the bus. The signals from the bus may be passively and actively filtered prior to a multiplexer. The multiplexer may be controlled by a variety of inputs. The output of the multiplexer is one or more probe points that may be connected to a measurement device.

An embodiment of the present invention may comprise a switchable probe board for probing a parallel bus comprising: a connector adapted to connect into the parallel bus; a plurality of signal paths corresponding to individual signals of the parallel bus, each of the plurality of signal paths having a passive filter, and an adjustable filter circuit, the plurality of signal paths being electrically communicated to the connector; a switch matrix connected to each of the plurality of signal paths and having at least one output; and a controller adapted to configure the switch matrix to connect one of the plurality of signal paths to the at least one output, the controller having an input; wherein the switchable probe board is a single printed circuit board.

Another embodiment of the present invention may comprise a method for probing a plurality of signals on a parallel bus comprising: providing a switchable probe board having a connector adapted to connect into the parallel bus, a plurality of signal paths corresponding to individual signals of the parallel bus, each of the plurality of signal paths having a passive filter, and an adjustable filter circuit, the plurality of signal paths being electrically communicated to the connector, a switch matrix connected to each of the plurality of signal paths and having at least one output, and a controller adapted to configure the switch matrix to connect one of the plurality of signal paths to the at least one output, the controller having an input, wherein the switchable probe board is a single printed circuit board; connecting the connector to the parallel bus; connecting a test device to the at least one output; causing the switch matrix to select a first of the plurality of signals to be connected to the at least one output by sending an input to the controller; measuring the first of the plurality of signals using the test device; causing the switch matrix to select a second of the plurality of signals to be connected to the at least one output by sending an input to the controller; and measuring the second of the plurality of signals using the test device.

Yet another embodiment of the present invention may comprise a switchable probe board for probing a parallel bus comprising: a first means for connecting to the parallel bus; a plurality of second means for preparing the signals in a fixed filter and an adjustable filter circuit, each of the plurality of second means corresponding to individual signals of the parallel bus, the plurality of second means being electrically communicated to the first means; a third means for probing a signal; a fourth means for selectively connecting one of the plurality of second means to the third means; and a fifth means for controlling the fourth means, the fifth means having an input; wherein the switchable probe board is a single printed circuit board.

The advantages of the present invention are that testing of busses with high signal counts may be performed under various conditions, including active filtering, with a minimum of set up and, in some embodiments, in an automated or semi-automated fashion. Such a system can speed debugging time and provide a repeatable method for characterizing the performance of a bus.

DETAILED DESCRIPTION OF THE INVENTION

Figure 1:
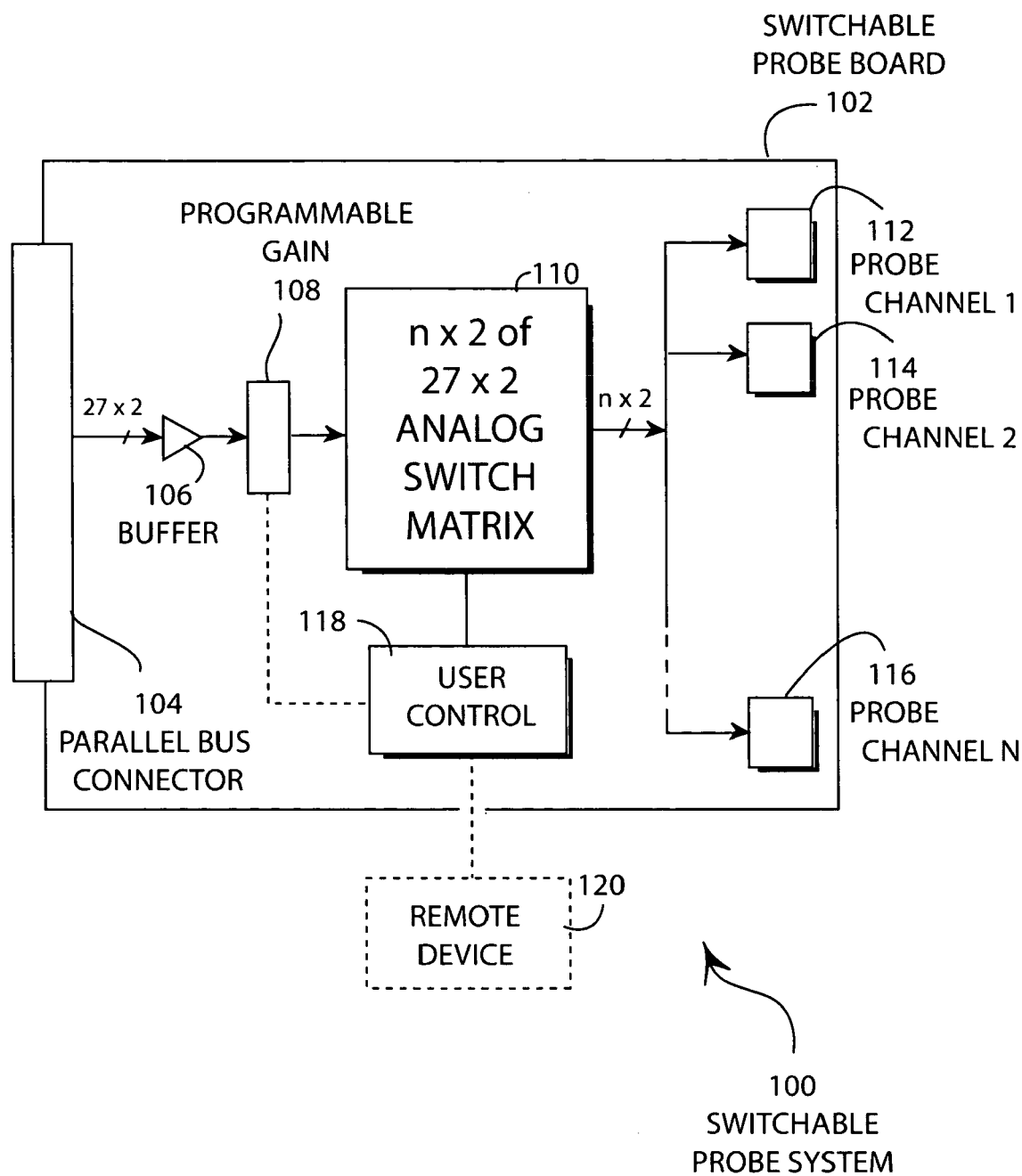
FIG. 1 is an illustration of an embodiment of the present invention showing a switchable probe system.

FIG. 1 illustrates an embodiment 100 of the present invention showing a switchable probe system. The switchable probe board 102 contains a parallel bus connector 104. The signals from the parallel bus connector 104 are routed through a buffer 106, a programmable gain module 108, and into a switch matrix 110. The output of the switch matrix 110 are probe channels 112, 114, and 116. The switch matrix 110 may be controlled by the user control 118. In some implementations, the user control 118 may interface with a remote device 120.

The embodiment 100 may be used to test a parallel bus such as a SCSI bus that has many parallel signals. Such busses may have 20 or more signals. As the number of signals increases, so too does the complexity of probing and measuring individual signals. Other embodiments may be developed for other parallel busses, such as the PCI bus or other parallel busses while keeping within the spirit and intent of the present invention.

The signals may enter the board 102 through the parallel bus connector 104. The parallel bus connector 104 may be a standard connector that is used to engage a stub port or other connection onto the bus to be tested. For example, in an application using a SCSI bus, the connector 104 may be a standard SCSI connector that may be found on a standard SCSI device, such as a disk drive.

The signals are sent through a buffer 106. The buffer 106 may be a passive or active set of components that are used to prepare the signals for testing. In some cases, the buffer 106 may have certain capacitance, impedance, and resistance characteristics such that the board 102 does not adversely affect the performance of the bus. In some instances, the buffer 106 may isolate the bus signals from the remaining circuitry on the board 102. Each application may have a specific set of electrical performance characteristics that may be determined by those skilled in the art.

The programmable gain circuit 108 may be used in some applications to set a skew value based on a training pattern broadcast on the bus by other devices or for other programmable or settable signal processing characteristics. In essence, When a training pattern is broadcast, the device 102 may analyze the pattern and select appropriate values of the adjustable circuitry 108 to maximize performance by minimizing skew and reducing inter-symbol interference. Various methods for determining the optimum values are known in the art and may or may not be directly applicable to the specific embodiment contemplated. In some embodiments, the programmable filter and deskew circuit 108 may not be present or the functionality may be switched out of the circuit. In still other embodiments, the user control 118 may be able to control the programmable filter and deskew circuit 108, including being able to read the values obtained by the circuit 108 after evaluation of the training patterns. In other embodiments, the programmable gain circuit 108 may comprise adjustable gain, filters, or other signal processing functions.

The analog switch matrix 110 may connect any of the various signal lines from the parallel bus to the probe channels 112, 114, and 116. In some embodiments, only one probe channel 112 may be used, while in other embodiments, several probe channels may be implemented.

The probe channels 112, 114, and 116 may be test points on the board 102 to which a test device may be connected, such as a logic analyzer, oscilloscope, volt meter, or other test device. Various mechanical configurations may be used by those skilled in the arts, depending on the test device, quality of signal, and other factors.

The user control 118 may be various types of input by which the switch matrix 110 may be controlled. In a very simple example, the user control 118 may be a set of dip switches. In other embodiments, the user control 118 may be a microprocessor that is able to automatically switch between input lines on a sequentially repeating basis. Such an embodiment may have a keypad and display mounted on the board 102. In still other embodiments, the user control 118 may be an interface to a remote device 120. Such an interface may be an IEEE-488, RS-232, Ethernet, or other interface.

Figure 2:
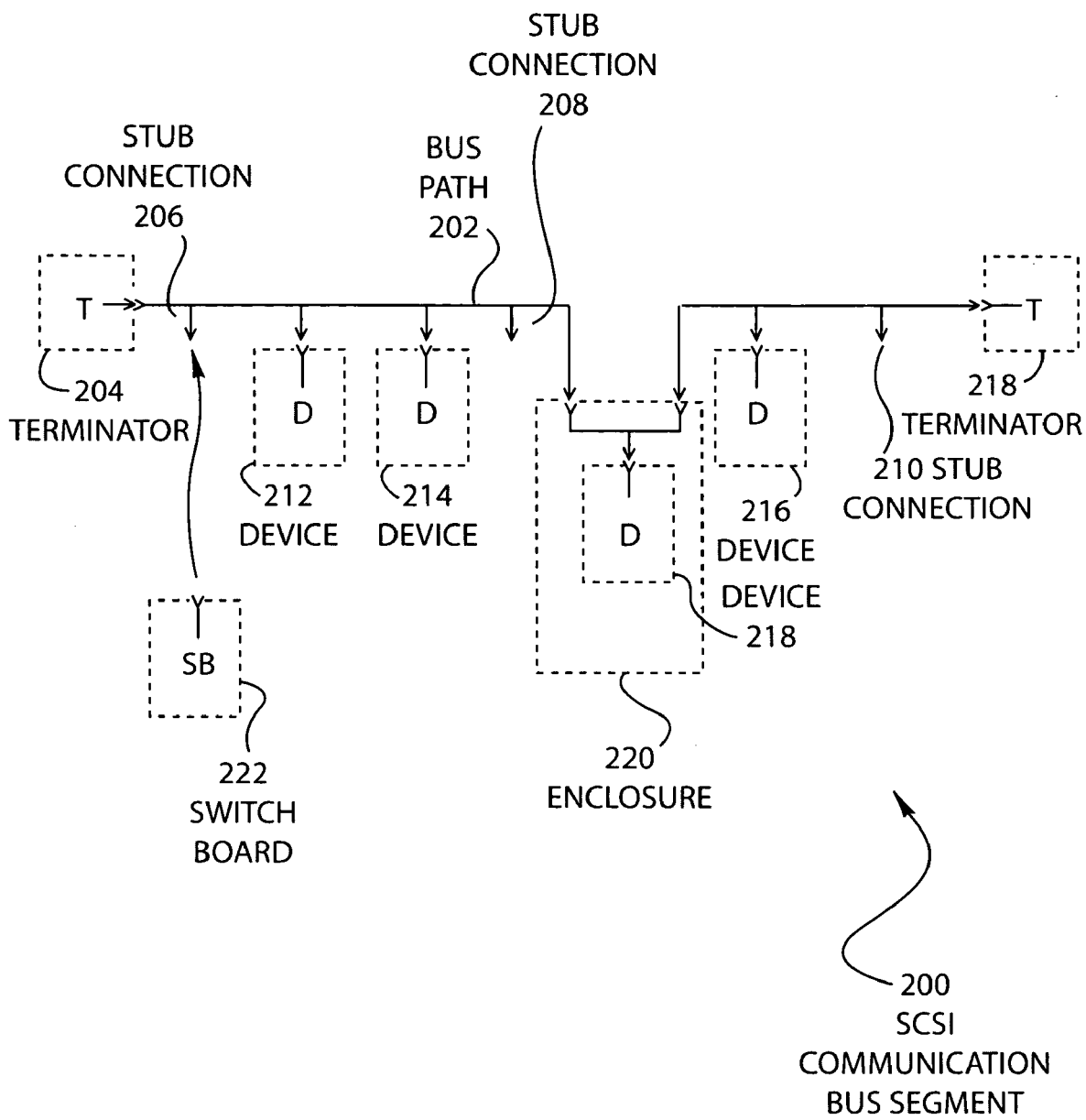
FIG. 2 is an illustration of an embodiment of the present invention showing a SCSI communication bus segment.

FIG. 2 illustrates an embodiment 200 of the present invention showing a SCSI communication bus segment. The bus path 202 has terminators 204 and 218 at either end. Several stub connections 206, 208, and 210 may be provided along the bus segment 202. Devices 212, 214, and 216 are connected directly into the bus segment 202. Device 218 is connected to the bus path 202 through an enclosure 220. The switch board 222 may be directly plugged into any of the stub connections 206, 208, or 210. Additionally, one of the devices 212, 214, 216, and 218 may be removed and replaced with the switch board 222 in order to test the connections at those points, if desired.

The embodiment 200 is shown as a SCSI bus. The use of SCSI is only as an example of the principles of operation of the invention. The present invention may be used with various other busses known in the art while keeping within the spirit and intent of the present invention.

The switch board 222 may be used to evaluate connectedness and performance of the bus path 202 at various locations. In some cases, the bus performance may be different if the switch board 222 were plugged into the stub connector 206 as compared to the stub connector 210. The ease and simplicity of testing the bus path 202 with the switch board 222 may allow a technician or engineer to characterize the bus performance, debug problems on the bus, or for other uses.

In cases where the devices on the bus are commonly disk drives, the mechanical configuration of the switch board 222 may be similar to that of a disk drive. For example, the size of the switch board 222 may be configured like that of a disk drive and mounting hardware may be attached to the circuit board so that the switch board 222 may be inserted and held in place using the same or similar guiding and mounting hardware as a disk drive. Such an embodiment has the benefit of enabling a bus path containing a plurality of disk drives to be checked readily and effectively.

Figure 3:
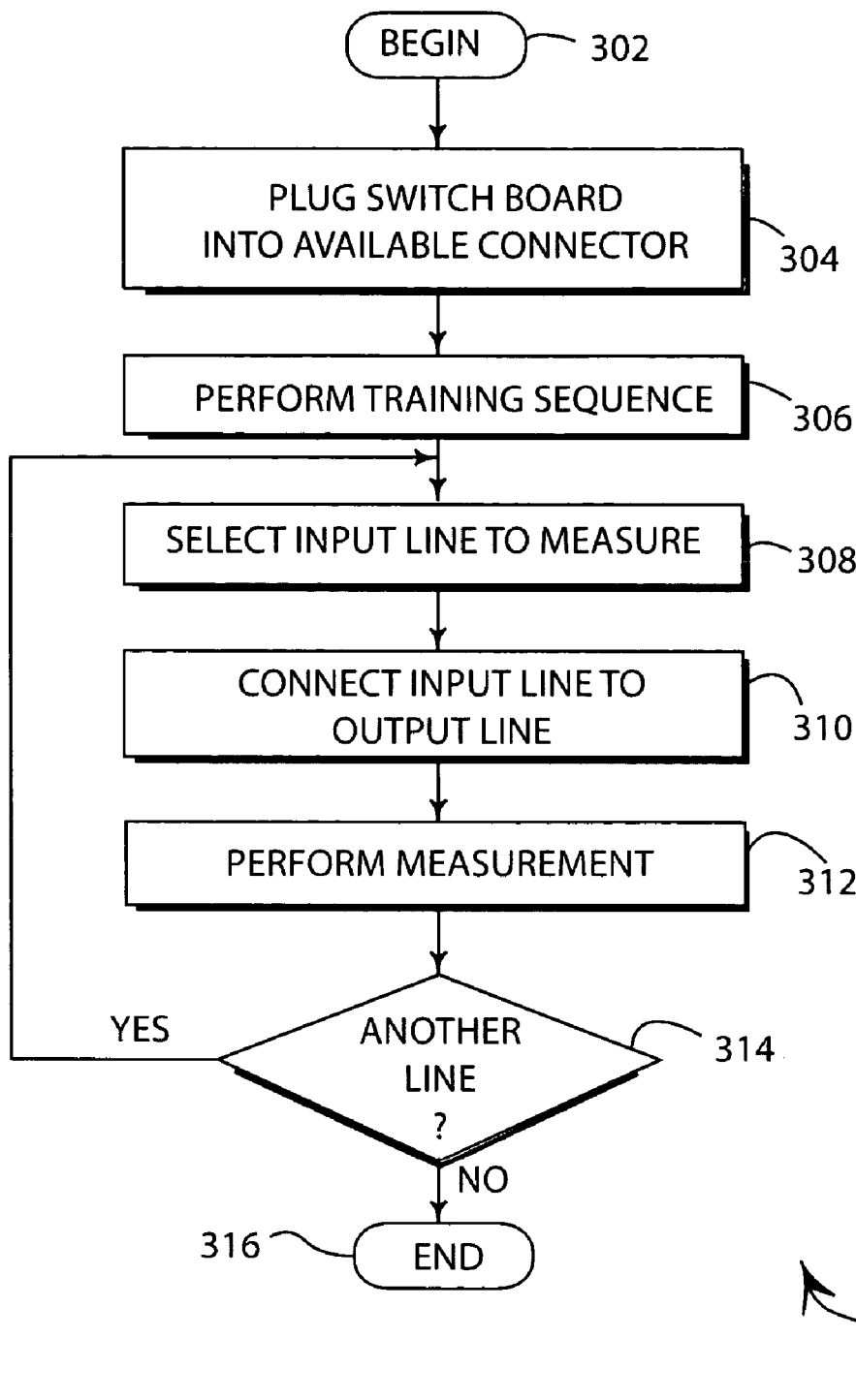
FIG. 3 is an illustration of an embodiment of the present invention showing a method for testing a parallel circuit.

FIG. 3 is an illustration of an embodiment 300 of the present invention showing a method for using a switch board. The process begins in block 302. The switch board is plugged into an available connector in block 304. If necessary, the training sequence may be performed on the bus in block 306. An input line is selected for testing in block 308 and the switch matrix on the switch board is activated to connect the determined input line to the output line in block 310. The measurement is performed in block 312. If another line is to be tested in block 314, the process returns to block 308. If not, the process ends in block 316.

The embodiment 300 illustrates a method by which one or more lines on a parallel bus may be tested using the switch board. In some cases, the selection of the appropriate input line may be done manually, such as setting a rotary switch or dip switch. In other cases, the determination of the line, the length of test, and other parameters may be programmed into the user controller of the switch board. In such cases, the board may be used to perform fully or semi-automated tests of a parallel bus. Such automated tests may quickly and efficiently test many or all of the signal lines of a bus in a short period of time, substantially saving time and increasing the repeatability and reliability of the measurements. In cases where an automated test is performed, an automated test apparatus may be configured to simultaneously control the switch matrix and the measurement device.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A switchable probe board for probing a parallel bus comprising:
   a connector for connecting into said parallel bus;
   a plurality of signal paths corresponding to individual signals of said parallel bus, each of said plurality of signal paths having a passive filter, and an adjustable filter circuit, said plurality of signal paths being electrically communicated to said connector;
   a switch matrix connected to each of said plurality of signal paths and having at least one output; and
   a controller adapted to configure said switch matrix to connect one of said plurality of signal paths to said at least one output, said controller having an input;
   wherein said switchable probe board is a single printed circuit board.

2. The switchable probe board of claim 1 wherein said controller comprises dip switches.

3. The switchable probe board of claim 1 wherein said controller comprises a microprocessor programmable to cause said switch matrix to sequentially switch a predetermined set of said plurality of signal paths to said at least one output.

4. The switchable probe board of claim 3 wherein said controller communicates on a second communications bus.

5. The switchable probe board of claim 4 wherein said controller is programmed by a second device communicating over said second communications bus.

6. The switchable probe board of claim 1 wherein said adjustable filter circuit receives a training pattern of signals on said parallel bus and said adjustable filter circuit is set to a skew value based on said training pattern.

7. The switchable probe board of claim 1 wherein said parallel bus is a SCSI bus.

8. The switchable probe board of claim 1 wherein said parallel bus is a PCI bus.

9. The switchable probe board of claim 1 further comprising mounting hardware for simulating the mounting hardware of a disk drive.

10. A method for probing a plurality of signals on a parallel bus comprising:
    providing a switchable probe board having a connector adapted to connect into said parallel bus, a plurality of signal paths corresponding to individual signals of said parallel bus, each of said plurality of signal paths having a passive filter, and an adjustable filter circuit, said plurality of signal paths being electrically communicated to said connector, a switch matrix connected to each of said plurality of signal paths and having at least one output, and a controller for configuring said switch matrix to connect one of said plurality of signal paths to said at least one output, said controller having an input, wherein said switchable probe board is a single printed circuit board;
    connecting said connector to said parallel bus;
    connecting a test device to said at least one output;
    causing said switch matrix to select a first of said plurality of signals to be connected to said at least one output by sending an input to said controller;
    measuring said first of said plurality of signals using said test device;
    causing said switch matrix to select a second of said plurality of signals to be connected to said at least one output by sending an input to said controller; and
    measuring said second of said plurality of signals using said test device.

11. The method of claim 10 wherein said controller comprises dip switches.

12. The method of claim 10 wherein said controller comprises a microprocessor programmable to cause said switch matrix to sequentially switch a predetermined set of said plurality of signal paths to said at least one output.

13. The method of claim 12 wherein said controller communicates on a second communications bus.

14. The method of claim 13 wherein said controller is programmed by a second device communicating over said second communications bus.

15. The method of claim 10 wherein said adjustable filter circuit receives a training pattern of signals on said parallel bus and sets said adjustable filter circuit to a skew value based on said training pattern.

16. The method of claim 10 wherein said parallel bus is a SCSI bus.

17. The method of claim 10 wherein said parallel bus is a PCI bus.

18. The method of claim 10 further comprising mounting hardware for simulating the mounting hardware of a disk drive.

19. A switchable probe board for probing a parallel bus comprising:
    a first means for connecting to said parallel bus;
    a plurality of second means for preparing said signals in a fixed filter and an adjustable filter circuit, each of said plurality of second means corresponding to individual signals of said parallel bus, said plurality of second means being electrically communicated to said first means;
    a third means for probing a signal;
    a fourth means for selectively connecting one of said plurality of second means to said third means; and
    a fifth means for controlling said fourth means, said fifth means having an input;
    wherein said switchable probe board is a single printed circuit board.

20. The switchable probe board of claim 19 wherein said input to said fifth means comprises dip switches.

21. The switchable probe board of claim 19 wherein said fifth means comprises a microprocessor programmable to cause said fourth means to sequentially switch a predetermined set of said plurality of second means to said third means.

22. The switchable probe board of claim 21 wherein said fifth means communicates on a second communications bus.

23. The switchable probe board of claim 22 wherein said fifth means is programmed by a second device communicating over said second communications bus.

24. The switchable probe board of claim 19 wherein said adjustable filter circuit receives a training pattern of signals on said parallel bus and sets said adjustable filter circuit to a skew value based on said training pattern.

25. The switchable probe board of claim 19 wherein said parallel bus is a SCSI bus.

26. The switchable probe board of claim 19 wherein said parallel bus is a PCI bus.

27. The switchable probe board of claim 19 further comprising a sixth means for mounting said switch probe board wherein said sixth means simulates the mounting hardware of a disk drive.

* * * * *